No. 715,901. Patented Dec. 16, 1902.
E. THOMSON.
CONTROLLING ELECTRIC ARCS.
(Application filed Apr. 12, 1902.)
(No Model.)
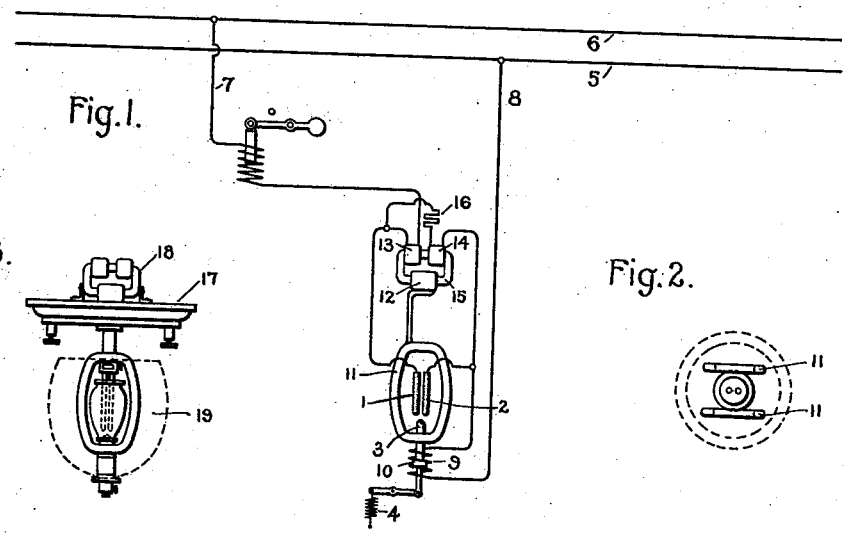
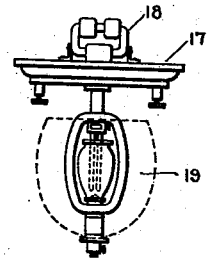
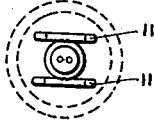
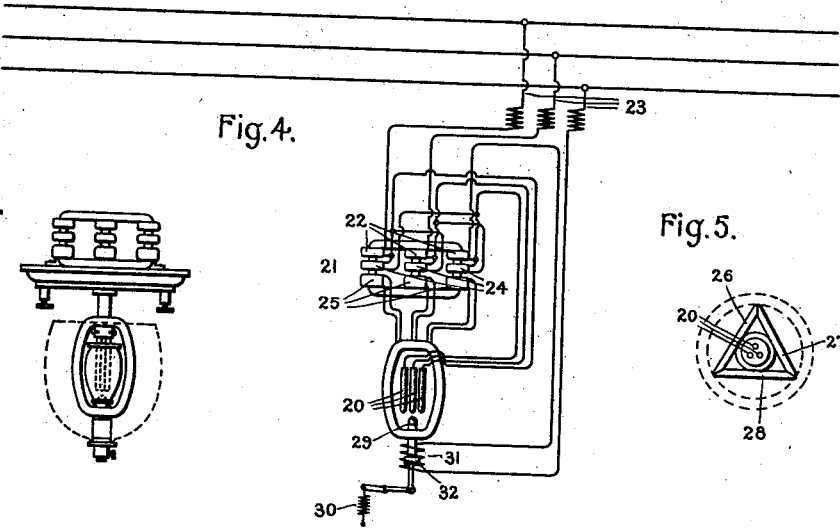
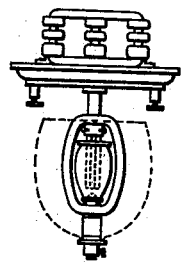
Witnesses.
J. Ellis Glenn.
Helen Orford
Inventor:
Elihu Thomson
by Albert S. Davis
Atty.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

CONTROLLING ELECTRIC ARCS.

SPECIFICATION forming part of Letters Patent No. 715,901, dated December 16, 1902.

Application filed April 12, 1902. Serial No. 102,516. (No model.)

*To all whom it may concern:*

Be it known that I, ELIHU THOMSON, a citizen of the United States, residing at Swampscott, in the county of Essex, State of Massachusetts, have invented certain new and useful Improvements in Controlling Electric Arcs, (Case No. 2,599,) of which the following is a specification.

My present invention relates to the control of electric arcs and to mechanism for effecting this purpose.

The novel features of the invention will be pointed out in the appended claims, while in the following specification will be given a detailed description of certain embodiments of my invention, together with an explanation of the mode of operation thereof.

In the drawings, in connection with which the following specification is to be read, Figures 1, 2, and 3 represent an arrangement for controlling an electric arc produced by single-phase alternating current, while Figs. 4, 5, and 6 set forth an arrangement for controlling an arc produced by multiphase alternating current.

In Fig. 1 the pencils 1 and 2 represent two stationary electrodes, between the lower ends of which an arc is to be formed. To start the arc between these electrodes, I make use of a starting-electrode 3, which when no current is flowing is held by a spring 4 and suitable connecting means in contact with the lower ends of these electrodes, so as to connect the same together. When current is supplied from the supply-mains 5 6, it flows from the mains through leads 7 and 8 and through the starting-electrode 3, which forms a bridge between the ends of the electrodes 1 and 2. As soon as this current flows it energizes a solenoid 8 in series with one of the leads, as indicated, which solenoid then operates upon a core 10, carrying the starting-electrode 3, and withdraws this electrode from contact with the main electrodes 1 and 2. The arc then starts between these latter electrodes and is controlled in length and position by means of a magnetic field due to a coil or coils 11, (represented in side elevation in Fig. 1 and in a plan view, partly in section, in Fig. 2.)

The current in the controlling coil or coils 11 is due to the differential effect of a main current in the arc and of a current flowing in shunt to the arc. To secure this differential current, I make use of a transformer, represented with a single secondary coil 12 and two primary coils 13 and 14, all mounted on the same core 15. The primary coil 13 carries the main current of the lamp, while the coil 14 is connected in shunt to the main electrodes 1 and 2, between which the arc is formed, and includes a series resistance 16 for adjusting and regulating the strength of this current. The connections are made so that the shunt-coil and the series coil act in opposition to each other, thereby causing the current in the secondary coil 12 to represent the differential effect of the primary coils. As the arc starts it is bowed down from the ends of the electrodes by the magnetic field due to the controlling coil or coils 11, and this lengthening or bowing down of the arc continues until the increasing drop of potential across the arc so far counterbalances the effect of the main current of the lamp as to cause the current in the secondary 12, supplying the regulating coil or coils 11, to reach a steady condition.

While Fig. 1 represents the lamp largely in diagram, Fig. 3 sets forth the same as it may be constructed in practice, and consists, as indicated, of a base-plate 17, carrying the regulating-transformer 18 above, while suspended therefrom is the arc producing and controlling mechanism, (represented at 19.)

In Fig. 4, which represents in diagram an arrangement made in accordance with my invention for utilizing three-phase current, the three electrodes are represented at 20. While for clearness they are here represented side by side, it should be stated that in practice they are arranged triangularly, as indicated in Fig. 5, which shows a portion of the lamp in plan view and partly in cross-section.

The regulating-transformer for the lamp is indicated at 21 and comprises a three-legged core, having mounted thereon series coils 22, in series with the supply-mains 23, shunt-coils 24, in shunt to the pairs of electrodes 20, and secondary coils 25, mounted within inductive influence of the series and shunt coils.

These secondary coils supply, respectively, three controlling-coils, (represented, perhaps, best at 26, 27, and 28 in Fig. 5,) the function of these coils being substantially the same as the coils 11 in Fig. 2. Fig. 6 is a representation of a practical embodiment of the lamp shown in diagram in Fig. 4.

To start the lamp, a starting-electrode 29 is employed, this electrode when no current is passing in the lamp being maintained by a spring 30 or other device in contact with the lower ends of the three electrodes 20. When current is turned onto the lamp, the solenoid 31, in series with one of the mains 23, acts upon a magnetic core 32, which carries the starting-electrode 29, and withdraws the latter from contact with the ends of the electrodes 20, thereby starting the arc between the several pairs of electrodes. This arc, or the component portions of the arc, is controlled by the differential effect of the current in series with the lamp and the current in the several shunt-circuits about the arcs in a manner already described in connection with Fig. 1.

What I claim as new, and desire to secure by Letters Patent of the United States, is—

1. The combination of stationary electrodes, means for starting an arc between said electrodes, a coil for controlling said arc, and means for supplying said coil with a current due to the differential action of two currents, one flowing in shunt to the arc and the other in series therewith.

2. The combination of electrodes, means for starting an arc between said electrodes, a coil for controlling said arc, and means for supplying said coil with a current representing the differential action of a current in series with the arc and a current in shunt to the arc.

3. The combination of electrodes arranged side by side, means for starting an arc between ends of said electrodes, a coil for controlling said arc, and means for causing current in said coil to decrease when the arc lengthens and increase when the arc shortens.

4. The combination of electrodes placed out of line with each other, means for establishing an arc between ends of said electrodes, a coil for controlling said arc, and means for causing current to flow in said coil of such value and direction as to represent a differential action of the main current of the lamp and a voltage across the arc.

In witness whereof I have hereunto set my hand this 9th day of April, 1902.

ELIHU THOMSON.

Witnesses:
DUGALD McK. McKILLOP,
ROBERT SHAUD.